Jan. 22, 1924.                                                    1,481,268
                        J. F. OHMER, JR., ET AL
              DRIVING MEANS FOR TAXIMETERS AND SPEEDOMETERS
                    Filed Sept. 11, 1919        2 Sheets-Sheet 1
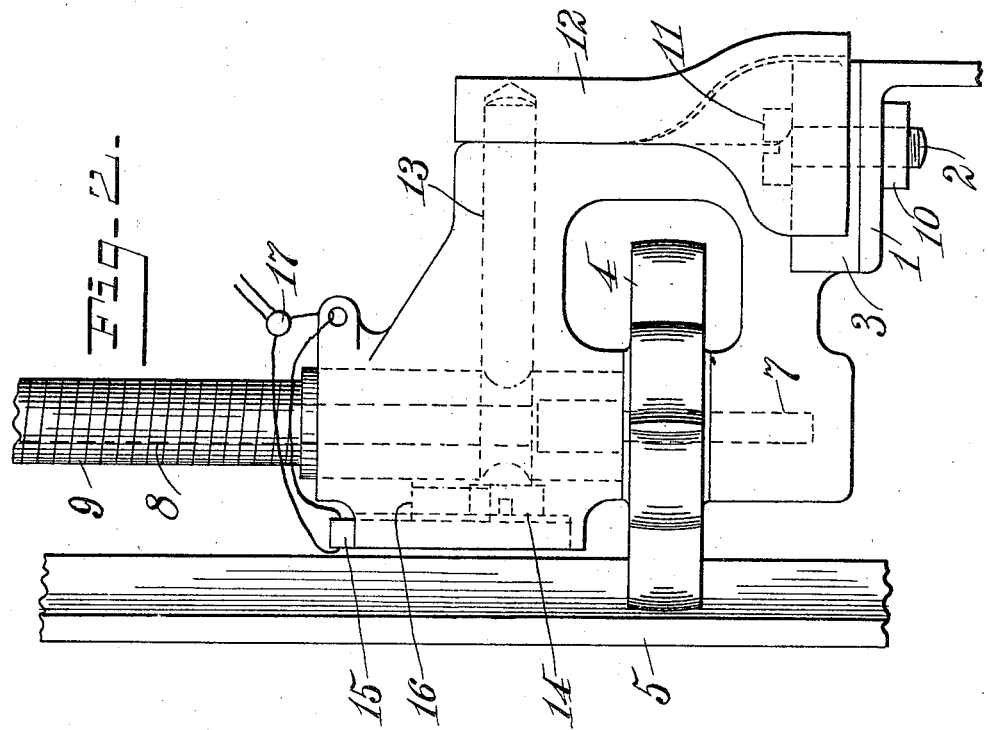
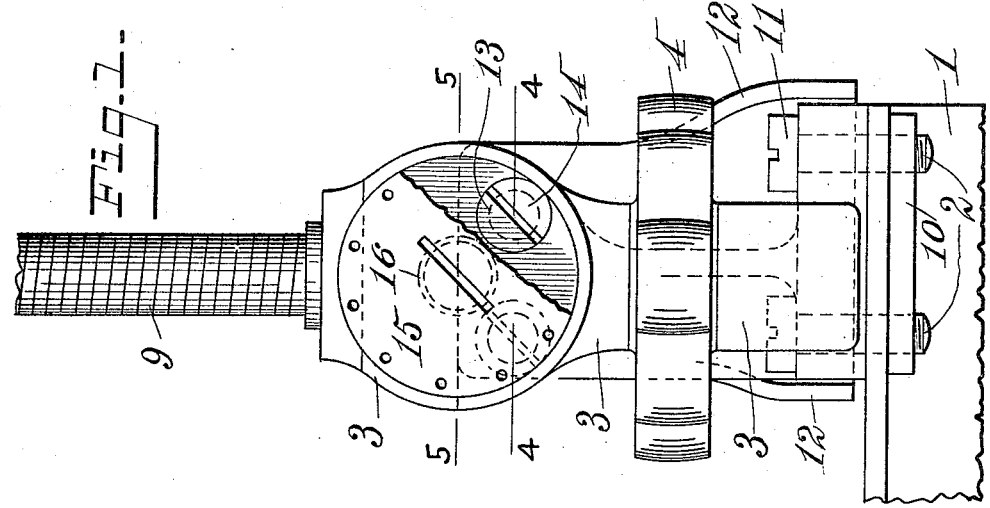
WITNESS.                                           INVENTORS
                                                John F. Ohmer Jr
                                                  Fred Gray
                                           By R. J. McCarty
                                                     ATTORNEY.

Jan. 22, 1924.   1,481,268
J. F. OHMER, JR., ET AL
DRIVING MEANS FOR TAXIMETERS AND SPEEDOMETERS
Filed Sept. 11, 1919   2 Sheets-Sheet 2
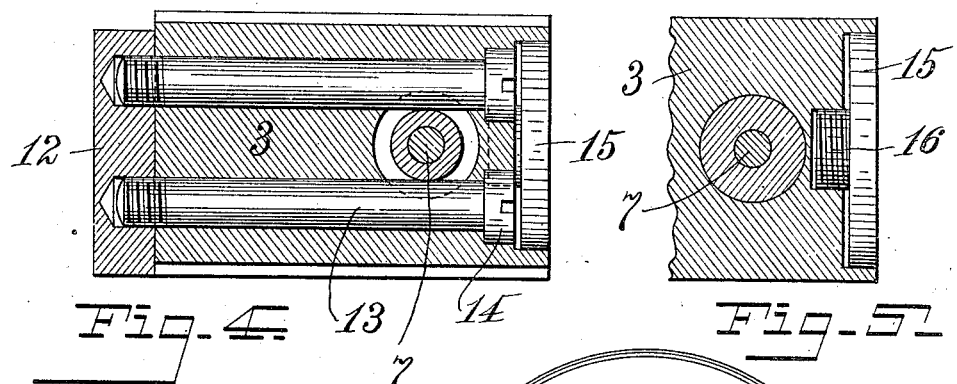
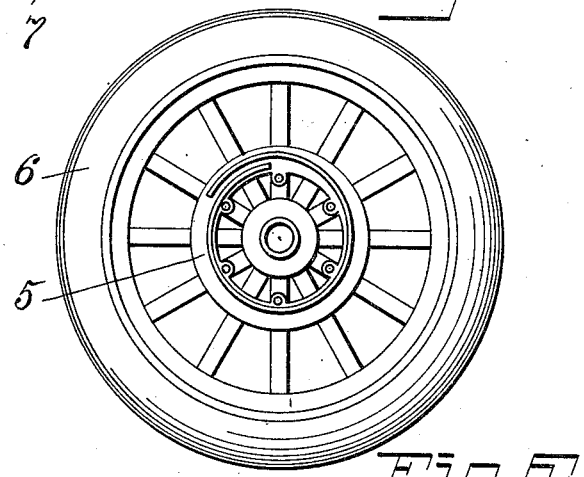
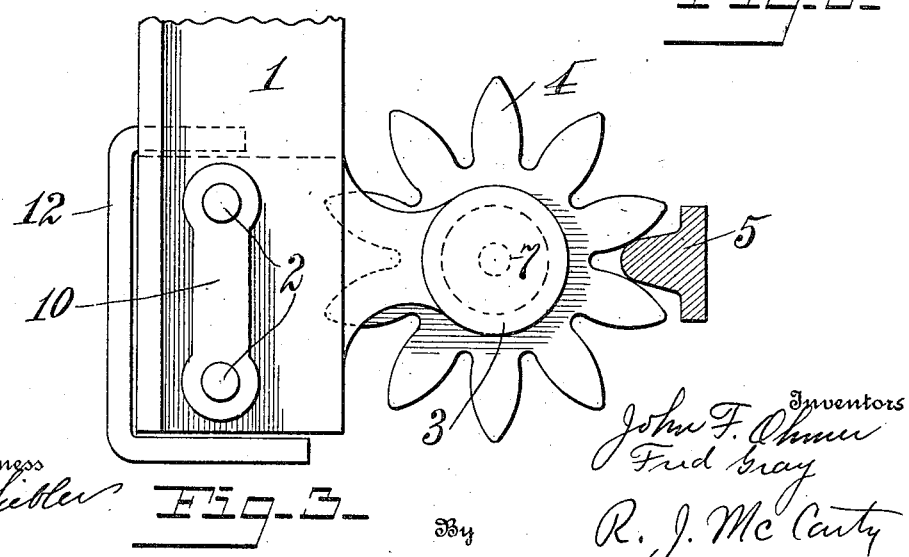

Patented Jan. 22, 1924.

1,481,268

UNITED STATES PATENT OFFICE.

JOHN F. OHMER, JR., AND FRED GRAY, OF DAYTON, OHIO.

DRIVING MEANS FOR TAXIMETERS AND SPEEDOMETERS.

Application filed September 11, 1919. Serial No. 323,209.

*To all whom it may concern:*

Be it known that we, JOHN F. OHMER, Jr., and FRED GRAY, citizens of the United States, residing at Dayton, in the county of Montgomery and State of Ohio, have invented certain new and useful Improvements in Driving Means for Taximeters and Speedometers, of which the following is a specification.

This invention relates to new and useful improvements in driving means for taximeters and speedometers. The object of the invention is to provide means whereby the taximeter or speedometer is prevented from being disconnected from the driving wheel thereby eliminating the possibility of the taxicab or automobile being operated without operating the taximeter or speedometer.

Referring to the accompanying drawings; Fig. 1 is a front elevation of the improvement; Fig. 2 is a side elevation of the same; Fig. 3 is a bottom plan view; Fig. 4 is a section on the line 4—4 of Fig. 1; Fig. 5 is a section on the line 5—5 of Fig. 1; and Fig. 6 is a view of the driving wheel of the vehicle and of the worm gear attached thereto.

Referring more particularly to the accompanying drawings, —1— represents a bracket mounted on the chassis (not shown) and in proximity to the taximeter or speedometer driving wheel of the vehicle. Secured to the bracket —1—, by means of screws —2—, is a supporting structure, such as a frame —3—. Mounted in the frame —3— is a driving member or gear —4— in mesh with an actuating device, here shown as a spiral gear —5— attached to the taximeter or speedometer driving wheel —6— of the vehicle. The gear —4— is mounted on the end —7— of a flexible shaft —8— which extends through a flexible casing —9—. The end of the flexible shaft —8—, opposite the end —7—, is connected to the taximeter or speedometer (not shown). The above mechanism constitutes one well known form of driving means for taximeters and speedometers. To prevent the driver moving the frame —3—, thereby unmeshing the gears —4— and —5— and surreptitiously operating the vehicle, the following means are provided.

The screws —2— are threaded into a duplex nut or plate —10— which is non-rotatable and which, therefore, compels the screws to be extracted by a tool in engagement with their heads —11—. When the device is completely assembled, the heads —11— are encased by a housing —12— which prevents access being had to the heads. The housing —12— is secured to the frame —3— by screws —13—, which extend through the frame —3—, and the heads —14— of which are covered by a circular disc —15—. The disc —15— is secured to the housing or frame —3— by a threaded lug —16—. The disc —15— prevents access being had to the screw heads —14—, and said disc is thus prevented from being removed by the gear —5— which passes over the face of the disc. The disc —15— may be held in a set position by a seal —17—. As the gear —5— passes over the face of the disc —15—, the driving wheel —6— must be entirely removed to permit the gears —4— and —5— to be unmeshed, thereby rendering the vehicle totally inoperative. It will be seen, therefore, that in order to disconnect the taximeter or speedometer from the driving wheel, the driving wheel must be first removed, and successively the cover plate consisting of the disc —15—, the screws —13—, the cover plate consisting of the housing —12— and the screws —2—.

While we have shown and described one embodiment of our invention this has been chosen for the purpose of illustration only and we wish it to be understood that we do not desire to be limited to the details thereof as various modifications may occur to a person skilled in the art.

Having described our invention, we claim;

1. In a driving means for taximeters and the like, a driving wheel of an automobile, a gear secured thereto, a second gear in mesh therewith, a frame supporting said second gear, a bracket supporting said frame, means attaching said frame to said bracket, a cover plate for said attaching means, the removal of said cover plate being under the control of said wheel.

2. In a driving means for taximeters and the like, a driving wheel of an automobile, a gear secured thereto, a second gear in mesh therewith, a frame supporting said second gear, a bracket supporting said frame, a screw attaching said frame to said bracket, a cover plate for said screw, a second screw attaching said cover plate to said frame, a second cover plate for said second screw, the removal of said second cover plate being under the control of said wheel.

3. In a driving means for taximeters and the like, a driving wheel of an automobile, a gear secured thereto, a second gear in mesh therewith, a frame supporting said second gear, a bracket supporting said frame, a screw attaching said frame to said bracket, a non-rotatable nut for said screw, a cover plate for said screw, a second screw attaching said cover plate to said frame, a second cover plate for said second screws, the removal of said second cover plate being under the control of said wheel.

4. In a mechanism for driving taximeters and the like from a wheel of a vehicle, a driving member, a part connected with said wheel to actuate said driving member, a structure to support said driving member in operative relation to said part, means for attaching said supporting structure to a part carried by said vehicle, and means other than said supporting structure and separate from but adapted to be controlled by said wheel to prevent access being had to said attaching means while said wheel is in its normal position on said vehicle.

5. In a mechanism for driving taximeters and the like from a wheel of a vehicle, a driving member, a part connected with said wheel to actuate said driving member, a structure to support said driving member in operative relation to said part, means for attaching said supporting structure to a part carried by said vehicle, and a cover for said attaching means detachably secured to said structure, the removal of said cover being controlled by said wheel when said mechanism is mounted on the vehicle.

6. In a mechanism for driving taximeters and the like from a wheel of a vehicle, a driving member, a part connected with said wheel to actuate said driving member, a structure to support said driving member in operative relation to said part, means for attaching said supporting structure to a part carried by said vehicle, a cover for said attaching means, and means adapted to be controlled by said wheel for removably securing said cover to said supporting structure.

7. In a mechanism for driving taximeters and the like from a wheel of a vehicle, a driving member, a part connected with said wheel to actuate said driving member, a structure to support said driving member in operative relation to said part, means for attaching said supporting structure to a part carried by said vehicle, a cover for said attaching means, other fastening means to secure said cover in position, and a cover for the last mentioned fastening means, the last mentioned cover being so arranged that when said device is mounted on a vehicle the removal of the last mentioned cover will be prevented by said wheel.

8. In a mechanism for driving taximeters and the like, the combination with a vehicle wheel and an actuating part connected with said wheel, of a supporting structure, means for fastening said structure to said vehicle alongside of said wheel, a driving member carried by said structure in operative relation to said actuating part, a cover for said fastening means, and means carried by said structure on that side thereof adjacent to said wheel to control the removal of said cover.

9. In a mechanism for driving taximeters and the like, the combination with a vehicle wheel and an actuating part connected with said wheel, of a supporting structure, means for fastening said structure to said vehicle alongside of said wheel, a driving member carried by said structure in operative relation to said actuating part, a cover for said fastening means, a fastening device to detachably secure said cover to said structure, and a cover for the last mentioned fastening device arranged on that side of said structure adjacent to said wheel.

10. In a mechanism for driving taximeters and the like from the wheel of a vehicle, a supporting structure, means for securing said supporting structure to the vehicle, a rotatable driving member mounted on said structure, a flexible shaft to connect said driving member with a device to be operated, means controlled by said wheel to prevent said flexible shaft from being disconnected from said driving member, and a device adapted to be mounted on and to rotate with said wheel and to operatively engage said driving member.

11. In a mechanism for driving taximeters and the like from the wheel of a vehicle, a supporting structure, means for securing said structure to the vehicle, a driving gear mounted on said structure on an axis transverse to the axis of said wheel, said structure having a bore arranged axially of said driving gear, a flexible casing secured to said structure in line with said bore, a flexible shaft extending through said casing and said bore, and connected with said driving gear, means controlled by said wheel to prevent said flexible shaft from being disconnected from said driving gear, and a spiral rib to be mounted on said wheel and to operatively engage said driving gear.

In testimony whereof we affix our signatures.

JOHN F. OHMER, Jr.
FRED GRAY.